Patented Jan. 16, 1945

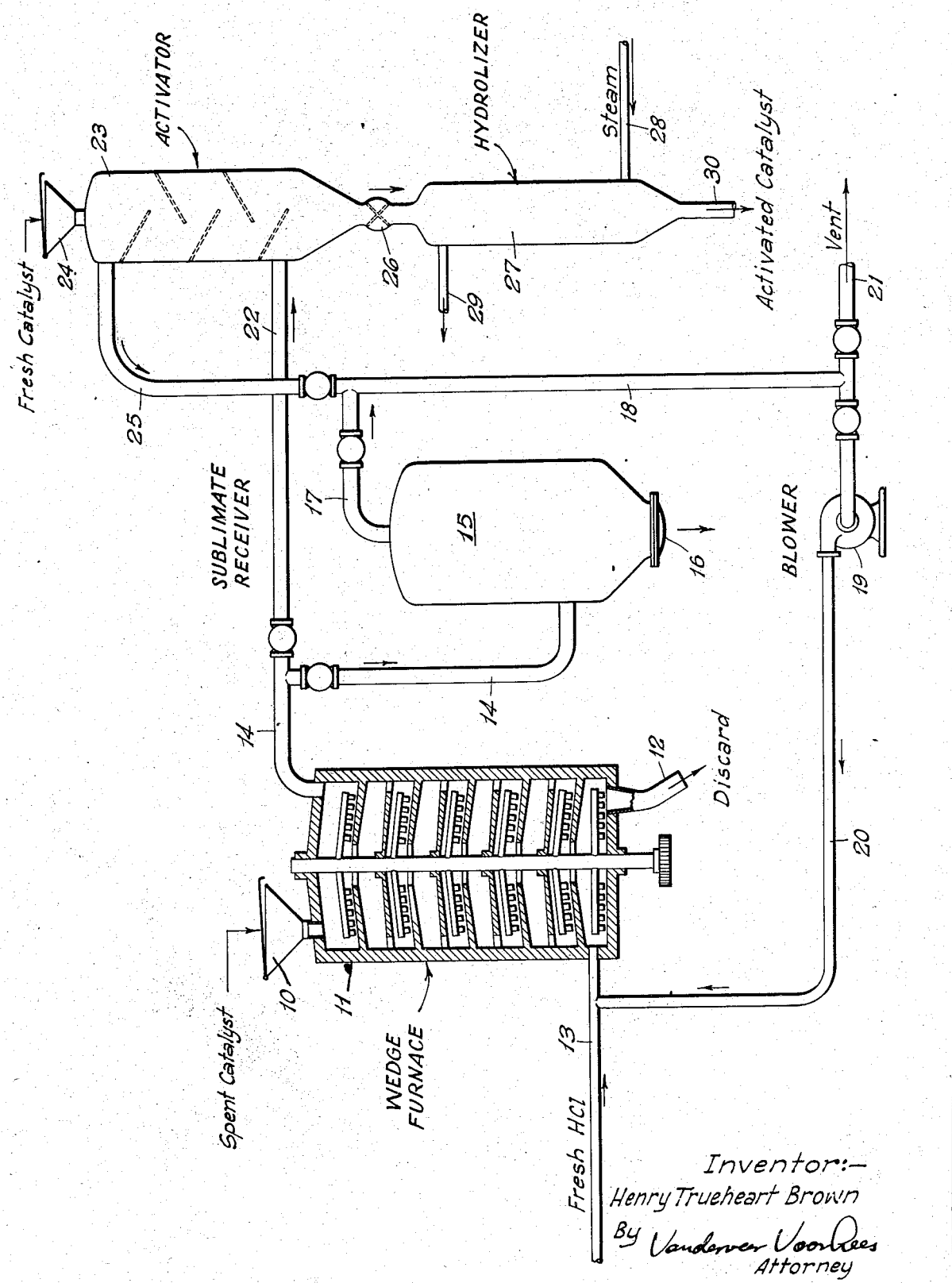

2,367,263

UNITED STATES PATENT OFFICE 2,367,263

TRANSFERRING MOLYBDENUM FROM SPENT CATALYST TO FRESH SOLID CATALYTIC MATERIAL

Henry Trueheart Brown, Whiting, Ind., assignor to Standard Oil Company, Chicago, Ill., a corporation of Indiana Application December 26, 1942, Serial No. 470,278

5 Claims. (Cl. 252—238)

This invention relates to a process of recovering molybdenum and more particularly to a process of recovering molybdenum from spent catalysts in which molybdenum forms an essential ingredient. In the hydrogenation of coals, tars, oils and other carbonaceous materials, in the catalytic dehydrogenation of oils, gases, petroleum hydrocarbons, and the catalytic dehydroaromatization of paraffinic and naphthenic hydrocarbons, the hydroforming of naphthas, etc., catalysts containing molybdenum have been employed to a great extent. These catalysts usually combine molybdenum oxide in a minor amount with a major proportion of other catalytic ingredients such as active silica, for example kieselguhr or silica gel, active alumina, for example alumina gel or bauxite, titania, zinc oxide, etc. The amount of molybdenum or molybdenum oxide employed in the preparation of such catalysts is usually of the order of 1 to 25 percent and generally about 5 to 10 percent.

Inasmuch as the molybdenum is the most valuable ingredient of the catalyst, considerable effort has been put forth to recover it from the spent catalyst after the catalytic activity has decreased to a point where it is no longer economic to continue using it. Various methods have been proposed for this purpose, generally involving conversion of the molybdenum in the catalyst into an alkali soluble form in which it is extracted from the spent catalyst by various alkaline solutions. These processes are beset with the difficulty of obtaining the molybdenum in a form in which it is suitable for reuse in the preparation of catalysts. They also require expensive extraction and washing operations.

I have now discovered that molybdenum may be recovered from spent catalysts and other materials by volatilization or sublimation in a current of hydrogen chloride gas passed into the catalyst material at an elevated temperature. Under these conditions the molybdenum appears to form a volatile complex oxychloride. By this method I have been able to recover 80 percent of the molybdenum contained in the catalyst and I anticipiate that pretreatment of the catalyst in various ways or retreatment of the catalyst after removal of molybdenum with HCl will result in substantially complete recovery of the molybdenum content.

The molybdenum recovered by my process is in a highly purified form substantially free from contamination by other metals. The complex chloride may be converted into molybdic acid or molybdic oxide by hydrolysis, or the molybdenum may be absorbed directly from the HCl gas onto various catalyst supports, e. g. activated alumina, active silica, or active charcoal, and then employed again for the treatment of carbonaceous materials, etc.

My invention is illustrated by a drawing which shows schematically in vertical section an apparatus for recovering molybdenum from a spent catalyst. Referring to the drawing, the spent catalyst in powdered or granular form is introduced by hopper 10 into furnace 11. Various types of furnaces may be employed for this purpose, for example a rotary kiln may be used, or the catalyst may be deposited in a bed in an insulated chamber and heated by superheated hydrogen chloride gas employed in the operation. The drawing shows a typical wedge furnace in which the catalyst is moved by plows carried on rabble arms across and downward over a series of hearths indirectly heated by means not shown. After passing through the furnace 11 the catalyst is discarded at 12.

Hydrogen chloride gas is introduced by line 13 at a low point in the furnace and passes upward over and through the catalyst descending through the furnace, departing by line 14. The temperature of the furnace may be maintained within the range of about 400 to 1000° F., preferably about 500 to 750° F. The desired temperature depends to a large extent on the character of the material treated, the volume of HCl employed, and the time of contact provided in the furnace.

Where powdered catalysts are treated it may be necessary to dedust the HCl-molybdenum gases leaving the furnace in order to prevent contamination of the molybdenum product with extraneous materials. For this purpose a dust filter may be employed or an electrical precipitator may be used. In the absence of dust the HCl gas may pass directly from the furnace 11 by line 14 into sublimate receiver 15 wherein the gases are cooled and the molybdenum chloride complex separates as a white crystalline material to be removed periodically through the bottom head 16. Receiver 15 may be equipped with suitable scraping apparatus (not shown on the drawing) to maintain relatively clean receiver walls and to transfer sublimed molybdenum oxide complex to the bottom of said receiver. HCl gas passes out at 17 and thence through line 18 and blower 19 discharging by line 20 back to the furnace 11. In this manner the HCl gas may be recycled until gaseous impurities accumulate in the system to an undesirable extent at which time the system may be purged of gas by venting through valved outlet 21. The system is then recharged with fresh HCl gas.

Instead of separating the molybdenum chloride complex as just described, the hot hydrogen chloride gas carrying molybdenum may be passed by line 22 to catalyst activating tower 23 in which the HCl is contacted with a stream or moving bed of adsorbent catalytic material, for example activated aluminum oxide, introduced through hopper 24. The molybdenum is substantially completely adsorbed on the alumina and the denuded gases are conducted by line 25 and lines 18 and 20 back to the furnace 11. The activated alumina is passed from tower 23 by star valve 26 into hydrolyzing chamber 27 wherein steam may be introduced by line 28 in a sufficient amount to hydrolyze the molybdenum compound on the catalyst and convert it to molybdenum oxide. The chamber 27 is provided with gas vent 29 near the top. Catalyst is withdrawn from chamber 27 by outlet 30. It may be employed directly in the treatment of carbonaceous materials or it may be subjected to calcining at elevated temperature, e. g. 800 to 1200° F., before use. Any hydrogen chloride adsorbed or occluded in the catalyst can be driven off in the calcining operation.

As an example of my process, aluminum oxide catalyst containing about 10 percent molybdenum oxide was used in the hydroforming of petroleum heavy naptha in the process of converting the heavy naptha to a gasoline of high knock rating containing an increased amount of aromatic hydrocarbons. In this process, naptha vapors are passed through a bed of catalyst held at a temperature of about 900 to 1000° F. in the presence of hydrogen gas supplied at a pressure of about 400 pounds per square inch. The rate of treating was maintained at about 0.5 to 2 volumes of naptha per hour per gross volume of catalyst and hydrogenous gases recovered from the process were recycled at the rate of about 2500 cubic feet per barrel of naptha charged. Under these conditions the operation was continued for several hours, then the operation interrupted, and the catalyst regenerated by combustion of air at a temperature between about 900 and 1200° F. This cycle was repeated for a period of weeks or months until the activity of the catalyst was permanently impaired to an uneconomical extent. The catalyst was then considered "spent" and was removed from the operation and replaced with fresh catalyst.

The spent catalyst withdrawn after regeneration from the above operation and containing about 8 percent molybdenum was treated thirty minutes at a temperature of 700° F. with a stream of hydrogen chloride gas. On cooling the gas withdrawn from the catalyst, molybdenum oxychloride complex was deposited as a white crystalline compound. In one experiment 71 percent of the molybdenum contained in the catalyst was recovered. In another experiment, under substantially the same conditions, 73 percent was recovered. In another experiment, with longer treatment, approximately 80 percent of molybdenum oxide was recovered.

Another experiment conducted at 580° F. yielded molybdenum in the amount of 66.4 percent of that contained in the spent catalyst. Further roasting of the catalyst after molybdenum recovery converted the residual molybdenum into a form susceptible to some further recovery by treatment with HCl gas.

The molybdenum is obtained from the recovery process in the form of snowy crystals extremely soluble in water. On analysis of one sample the formula was indicated as $MoO_3 \cdot 2HCl$. Owing to the process of sublimation employed, the complex is a very pure product and very desirable for use in impregnating catalysts. A water solution of the complex may be used directly for this purpose. If a water solution of the complex is evaporated, decomposition takes place leaving $MoO_3$ in a form which is readily soluble in aqueous ammonia. The ammonium molybdate formed may be used for impregnating catalysts. When a water solution of the complex is reduced by the action of zinc dust, etc. the characteristic molybdenum blue is obtained.

The reaction between the hydrogen chloride and the molybdenum in the catalyst is not clearly understood. It appears that only the molybdenum in the form of one particular oxide may be sublimable with HCl which would account for the fact that only about 70 percent of the molybdenum in spent catalyst is easily recoverable. As evidence of this is the fact that the hydrocarbon conversion operation effects a change in the chemical relation of the molybdenum oxide with respect to the alumina in the catalyst which change facilitates its recovery by the action of HCl gas, but the nature of this chemical change is not known. Whether the carbonaceous matter forms a compound with the molybdenum in the catalytic process, or whether it is simply a matter of reduction of molybdenum trioxide to a lower oxide is not established, but the latter explanation seems improbable considering the frequent regeneration of the catalyst by burning in the process and considering that roasting and ignition of the spent catalyst in air prior to HCl treatment does not prevent molybdenum recovery by my method. In fact, my method may be applied to the spent catalyst either before or after regeneration. The data obtained indicate that for optimum results in my process the hydrogen chloride gas should be essentially dry.

Having thus described my invention what I claim is:

1. The process of transferring molybdenum from spent molybdenum-activated aluminum oxide catalyst to fresh aluminum oxide catalytic material which comprises passing a current of HCl gas through said spent catalyst at an elevated temperature whereupon the molybdenum is vaporized from said spent catalyst in the form of a complex chloride and thereafter contacting said gas and molybdenum complex chloride vapors at a lower temperature with active aluminum oxide onto which said molybdenum chloride complex is adsorbed thereby effecting its catalytic activation.

2. The process of claim 1 wherein hydrogen chloride gas from said adsorption operation is recycled to said vaporizing operation.

3. The process of claim 1 wherein sufficient molybdenum chloride complex is adsorbed on said active aluminum oxide to be equivalent to 5 to 10 per cent of molybdenum oxide based on the weight of the catalyst.

4. The process of transferring molybdenum from spent molybdenum-activated catalyst to fresh solid catalytic materials which comprises passing a current of HCl gas through said spent catalyst at an elevated temperature whereupon the molybdenum is vaporized from said spent catalyst in the form of a complex chloride, thereafter contacting said gas and molybdenum complex chloride vapors at a lower temperature with a solid catalytic material onto which said molybdenum chloride complex is adsorbed and subjecting the solid catalytic material containing adsorbed molybdenum chloride complex to hydrolysis to convert the molybdenum complex to molybdenum oxide thereby effecting its catalytic activation before use in catalytic processes.

5. The process of transferring molybdenum from spent molybdenum-activated catalyst to fresh solid catalytic materials which comprises passing a current of HCl gas through said spent catalyst at an elevated temperature whereupon the molybdenum is vaporized from said spent catalyst in the form of a complex chloride, thereafter contacting said gas and molybdenum complex chloride vapors at a lower temperature with a solid catalytic material onto which said molybdenum chloride complex is adsorbed, subjecting said solid catalytic material containing adsorbed molybdenum chloride complex to hydrolysis to convert the molybdenum complex into molybdenum oxide and thereafter subjecting the molybdenum oxide-containing catalytic material to calcination to expel hydrogen chloride before use in catalytic processes.

HENRY TRUEHEART BROWN.